United States Patent
Lin (10) Patent No.: US 11,176,161 B2
(45) Date of Patent: Nov. 16, 2021

(54) DATA PROCESSING METHOD, APPARATUS, AND DEVICE

(71) Applicant: Advanced New Technologies Co., Ltd., George Town (KY)

(72) Inventor: Mingshu Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/082,849

(22) Filed: Oct. 28, 2020

(65) Prior Publication Data

US 2021/0042319 A1 Feb. 11, 2021

Related U.S. Application Data

(63) Continuation of application No. PCT/CN2019/100951, filed on Aug. 16, 2019.

(30) Foreign Application Priority Data

Sep. 30, 2018 (CN) .......................... 201811160195.0

(51) Int. Cl.
*G06F 16/25* (2019.01)
*G06F 9/54* (2006.01)

(52) U.S. Cl.
CPC ............ *G06F 16/258* (2019.01); *G06F 9/541* (2013.01); *G06F 9/542* (2013.01)

(58) Field of Classification Search
CPC ......... G06F 9/542; G06F 16/258; G06F 9/541
See application file for complete search history.

(56) References Cited

U.S. PATENT DOCUMENTS

| | | | |
|---|---|---|---|
| 2003/0097367 A1* | 5/2003 | Ma | G06F 16/284 |
| 2005/0198000 A1 | 9/2005 | Rapp | |
| 2005/0222810 A1* | 10/2005 | Buford | H04L 41/0631 702/183 |
| 2006/0053477 A1* | 3/2006 | Grabarnik | G06F 11/0709 726/1 |
| 2007/0162470 A1* | 7/2007 | Chang | G06F 40/154 |

(Continued)

FOREIGN PATENT DOCUMENTS

| | | |
|---|---|---|
| CN | 101458807 | 6/2009 |
| CN | 104092767 | 10/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Tuan C Dao
(74) *Attorney, Agent, or Firm* — Fish & Richardson P.C.

(57) ABSTRACT

The present application provides data processing methods, apparatuses, and electronic devices. One method includes: obtaining original event attributes of an event; performing data filling to obtain attribute data based on a pre-configured event correlation configuration that comprises an attribute configuration; and performing data conversion based on the original event attributes and the attribute data to obtain updated event attributes.

21 Claims, 5 Drawing Sheets

(56) References Cited

U.S. PATENT DOCUMENTS

| | | | | |
|---|---|---|---|---|
| 2007/0255529 | A1* | 11/2007 | Biazetti | G06F 9/542 |
| | | | | 702/186 |
| 2012/0123924 | A1 | 5/2012 | Rose et al. | |
| 2013/0097125 | A1* | 4/2013 | Marvasti | G06F 16/90 |
| | | | | 707/692 |
| 2014/0279427 | A1 | 9/2014 | Holman et al. | |
| 2014/0298341 | A1* | 10/2014 | Duftler | G06F 9/46 |
| | | | | 718/100 |
| 2016/0154632 | A1 | 6/2016 | Bai | |
| 2016/0224532 | A1* | 8/2016 | Miller | G06F 16/22 |
| 2017/0345105 | A1 | 11/2017 | Isaacson et al. | |
| 2018/0032535 | A1 | 2/2018 | Johnson | |

FOREIGN PATENT DOCUMENTS

| | | |
|---|---|---|
| CN | 105737619 | 7/2016 |
| CN | 105843878 | 8/2016 |
| CN | 106325756 | 1/2017 |
| CN | 106569791 | 4/2017 |
| CN | 106991164 | 7/2017 |
| CN | 107301536 | 10/2017 |
| CN | 108292244 | 7/2018 |
| CN | 109597695 | 8/2019 |
| TW | 201535282 | 9/2015 |

OTHER PUBLICATIONS

International Search Report and Written Opinion in International Application No. PCT/CN2019/100951, dated Oct. 30, 2019, 9 pages (Partial English Translation).

Nakamoto, "Bitcoin: A Peer-to-Peer Electronic Cash System," www.bitcoin.org, 2005, 9 pages.

PCT International Preliminary Report on Patentability in International Application No. PCT/CN2019/100951, dated Mar. 23, 2021, 10 pages (with English translation).

Extended European Search Report in European Application No. 19864462.7, dated Jun. 24, 2021, 6 pages.

* cited by examiner

FIG. 5

DATA PROCESSING METHOD, APPARATUS, AND DEVICE

CROSS-REFERENCE TO RELATED APPLICATIONS

This application is a continuation of PCT Application No. PCT/CN2019/100951, filed on Aug. 16, 2019, which claims priority to Chinese Patent Application No. 201811160195.0, filed on Sep. 30, 2020, and each application is hereby incorporated by reference in its entirety.

TECHNICAL FIELD

The present application relates to the field of computer technologies, and in particular, to data processing methods, apparatuses, and devices.

BACKGROUND

With the popularization of mobile phones, computers, and other terminals, the completion of a service usually requires a plurality of terminals and a plurality of systems to cooperate with each other.

In the existing technology, in order to meet the data conversion requirement between a plurality of service systems, it is usually necessary to convert the data corresponding to the service type by modifying the underlying code of each service system. For example, when data conversion between the first service system and the second service system is required, the underlying code of the first service system or the second service system can be modified so that data transmitted to the second service system can be used by the second service system. If the second service system needs to perform data conversion with the third service system, the underlying code of the second service system or the third service system needs to be further modified to implement data conversion between the second service system and the third service system. Therefore, it is necessary to modify the underlying code corresponding to one or more service systems to meet the data conversion requirements between the service systems.

Based on the existing technology, there is a need for a solution that can satisfy data conversion between a plurality of service systems.

SUMMARY

The present application provides data processing methods, apparatuses, and devices, so as to provide a solution that can satisfy data conversion between a plurality of service systems.

To alleviate the previously described technical problem, embodiments of the present application provide the following solutions:

The embodiments of the present application provide a data processing method, including: obtaining an original event attribute; filling data based on a predetermined event correlation configuration to obtain corresponding attribute data, where the predetermined event correlation configuration includes an attribute configuration; and performing data conversion based on the original event attribute and the attribute data to obtain an event attribute.

The embodiments of the present application provide a data processing device, including: an acquisition module, configured to obtain an original event attribute; a filling module, configured to fill data based on a predetermined event correlation configuration to obtain corresponding attribute data, where the predetermined event correlation configuration includes an attribute configuration; and a conversion module, configured to perform data conversion based on the original event attribute and the attribute data to obtain an event attribute.

The embodiments of the present application further provide an electronic device, including: at least one processor, and a memory communicably coupled to the at least one processor, where the memory stores instructions that can be executed by the at least one processor, and the instructions are executed by the at least one processor to enable the at least one processor to: obtain an original event attribute; fill data based on a predetermined event correlation configuration to obtain corresponding attribute data, where the predetermined event correlation configuration includes an attribute configuration; and perform data conversion based on the original event attribute and the attribute data to obtain an event attribute.

At least one technical solution provided in some embodiments of the present application can achieve the following beneficial effects:

In applications involving a plurality of service systems, operations such as data transmission and data processing usually need to be performed between the service systems. In order to improve the efficiency of data processing between different service systems, according to the previous method, general configuration can be set for the service systems to convert service event data in specific scenarios. Based on the previous method, configuration can be performed to ensure quick response and meet service requirements.

BRIEF DESCRIPTION OF DRAWINGS

To describe the technical solutions in some embodiments of the present application or in the existing technology more clearly, the following outlines the accompanying drawings for illustrating such technical solutions. Clearly, the accompanying drawings outlined below are some embodiments of the present application and a person skilled in the art can derive other drawings from such accompanying drawings without creative efforts.

DESCRIPTION OF EMBODIMENTS

To enable a person skilled in the art to better understand technical solutions in the present application, the following clearly and comprehensively describes the technical solutions in some embodiments of the present application with reference to accompanying drawings in some embodiments of the present application. Clearly, the described embodiments are merely some rather than all of the embodiments of the present application. Based on the embodiments of the present application, all other embodiments obtained by a person of ordinary skill in the art without creative efforts shall fall in the protection scope of the present application.

In the existing technology, if data transmission and data conversion need to be performed between a plurality of service systems, a technician usually writes corresponding underlying code. For example, if a first service system transmits first data to a second service system, and the data is processed by the second service system, the underlying code for implementing data conversion can be written in the first service system or the second service system. When a plurality of service systems are involved, more programmers are required to write more underlying code, which increases the workload of programmers and the workload of system maintenance personnel. Therefore, there is a need for a modular data model that can meet certain characteristic scenarios and can respond quickly to service requirements (for example, event attribute processing or data conversion) based on configurations.

Figure 1:
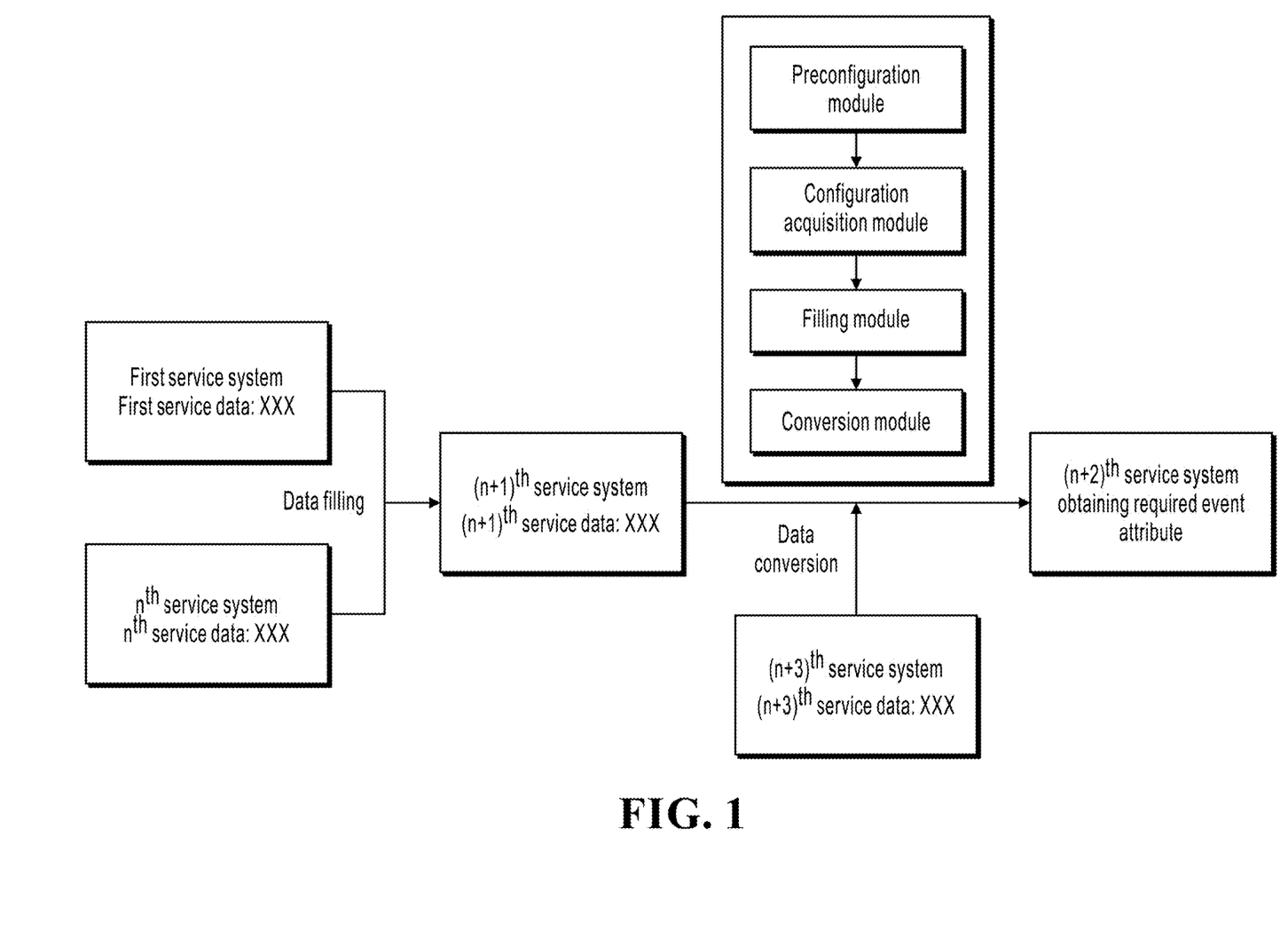
FIG. 1 is a schematic diagram illustrating a plurality of service systems in an actual application scenario of the solutions of the present application.

FIG. 1 is a schematic diagram illustrating a plurality of service systems in an actual application scenario of the solutions of the present application. A pre-configuration module obtains a plurality of pieces of event attribute data and the corresponding event correlation configuration based on the first service system (or the $n^{th}$ service system). The second service system (or the $(n+1)^{th}$ service system) needs to invoke the fourth service system (or the $(n+3)^{th}$ service system) to provide related data support. Data filling is implemented based on a filling module that is disposed on the second service system (or the $(n+1)^{th}$ service system), the third service system (or the $(n+2)^{th}$ service system), or the network connection between the second service system and the third service system, so as to obtain attribute data. Further, the attribute data and the original event attribute are sent to the third service system, and the conversion module performs data conversion to obtain the required event attribute.

It should be noted that the configuration acquisition module, the filling module, and the conversion module in FIG. 1 can be disposed on the second service system, the third service system, or the network connection between the second service system and the third service system. The pre-configuration module described here can be in the form of a web page, a desktop program, a static configuration included in code, etc.

The following describes in detail the solutions of the present application based on the previous scenario.

Figure 2:
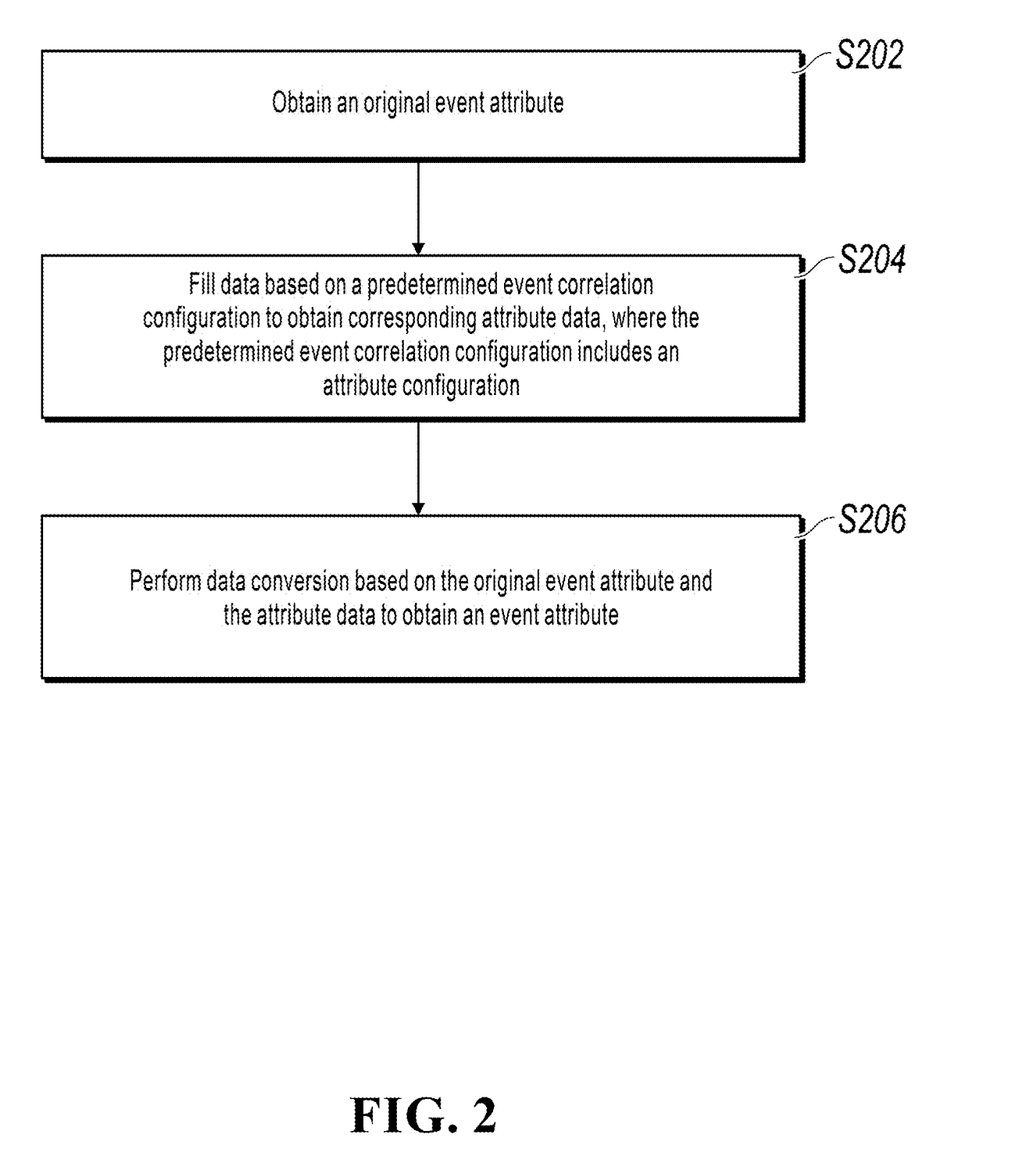
FIG. 2 is a flowchart illustrating a data processing method, according to the embodiments of the present application.

FIG. 2 is a flowchart illustrating a data processing method, according to the embodiments of the present application. The method includes the following steps:

Step S202: Obtain original event attribute.

The original event attribute can be obtained by a pre-configuration module. As can be seen from the above description, the pre-configuration module described here can be a web page. For example, a consumer can set shopping event attributes (such as product quantity, unit price, and product style) on a web page displayed on a computer or a mobile phone. It can also be a desktop program, such as a mobile phone APP. It can also be a static configuration included in code.

Step S204: Fill data based on a predetermined event correlation configuration to obtain corresponding attribute data, where the predetermined event correlation configuration includes an attribute configuration.

Data filling can specifically include filling corresponding data based on the obtained original event attribute and attribute configuration. For example, assume that the event is a user purchase order, and the original event attributes include a unit price, quantity, etc, then data filling is performed based on the attribute configuration, that is, the unit price and the quantity, so that the total price of the user purchase order can be obtained.

The attribute data described here can be understood as data obtained by performing data processing by using a data processing method (such as data conversion and data filling) that is predetermined through attribute configuration based on the original event attribute.

Step S206: Perform data conversion based on the original event attribute and the attribute data to obtain an event attribute.

The data conversion described here can be calculation processing (such as a simple data summation operation) for the data, or can be data format arrangement and conversion.

For example, assume that the event is a user purchase order, then original attributes include a user ID, user personal information (such as address and phone number), unit price, product quantity in the order, etc. Further, the attribute data, such as the total price of the order, is obtained by performing the data filling processing based on the unit price and the product quantity in the original event attribute.

Assume that the event attribute is a risk evaluation result of the current user purchase order. After the original event attribute and the processed attribute data are obtained, data conversion is performed to obtain the event attribute in the desired format, and the risk evaluation result based on the event attribute (that is, the user purchase order).

In one or more embodiments of the present application, the data processing method further includes: obtaining a predetermined event correlation configuration after an original event attribute is obtained, and a method of obtaining the predetermined event correlation configuration involved in step S204 can specifically include: obtaining, according to a predetermined attribute configuration mapping relationship, a configuration of at least one of the predetermined event correlation configuration mapped from the at least one attribute based on at least one of the original event attributes; or obtaining, according to the configuration attribute mapping relationship, a specified event correlation configuration based on the original event attribute.

For example, the mapping relationship between the original event attribute and the attribute configuration can be established in advance; and after the original event attribute or the attribute data is obtained, the mapping relationship between the original event attribute and the attribute data and the corresponding attribute configuration can be established according to the mapping relationship, so as to implement data processing and conversion of the corresponding attribute.

Of course, the corresponding original event attribute can be preconfigured in the underlying code, and after the attribute data is obtained based on the original event attribute and the attribute configuration, data processing and conversion of the corresponding attribute can be further implemented.

In one or more embodiments of the present application, the event correlation configuration further includes a predetermined attribute configuration; the attribute data further includes a predetermined attribute; and filling data based on a predetermined event correlation configuration to obtain corresponding attribute data specifically includes: filling data based on the predetermined attribute configuration and the original event attribute, and performing conversion to obtain a predetermined attribute.

Predetermined attributes need to be obtained in some event processing processes, and do not need to be obtained in some other event processing processes.

If the current attribute configuration includes the predetermined attribute configuration, data filling is performed, and the predetermined attribute is obtained through conversion based on the event predetermined attribute configuration. It should be noted that when the data filling for the original event attribute is implemented based on the predetermined attribute configuration, the data filling can be performed by using some of the attribute data in the original event attribute.

In one or more embodiments of the present application, the event correlation configuration further includes a correlation data configuration; and the attribute data further includes correlation data; and the filling data based on a predetermined event correlation configuration to obtain corresponding attribute data specifically includes: filling data based on a predetermined correlation data configuration, the original event attribute, and the predetermined attribute to obtain required correlation data, where the correlation data is obtained locally, from a storage system, or from a third party system.

In practice, when data processing is performed on some original event attributes, other correlated auxiliary data needs to be obtained. For example, when the risk analysis is performed on the payment behavior of the user, a membership system also needs to provide the membership registration data of the user, so as to analyze the risk of the current payment event.

In the method of obtaining the correlation data, the requesting party can proactively obtain the correlation data, or the data storage party can provide the correlation data. It is worthwhile to note that the original event attribute can be stored locally, in a storage system (for example, a cloud disk), or in a third-party system (for example, a membership system).

In one or more embodiments of the present application, performing data conversion based on the original event attribute and the attribute data to obtain an event attribute can specifically include: arranging the obtained original event attribute and the correlation data to obtain to-be-converted data; and converting the to-be-converted data based on a specified conversion mode to obtain an event attribute.

The arrangement described here can be understood as the arrangement of the data format. Generally, the original event attribute and the correlation data are in different formats. Before data conversion, it is necessary to unify the formats of the original event attribute and the correlation data to obtain the to-be-converted data. Further, data conversion is performed on the data based on a specified conversion mode to obtain an event attribute. The specified conversion mode described here includes conversion based on a configuration script; or using a specified language expression, and then using a conversion unit to parse and execute the semantics of the specific language expression.

Figure 3:
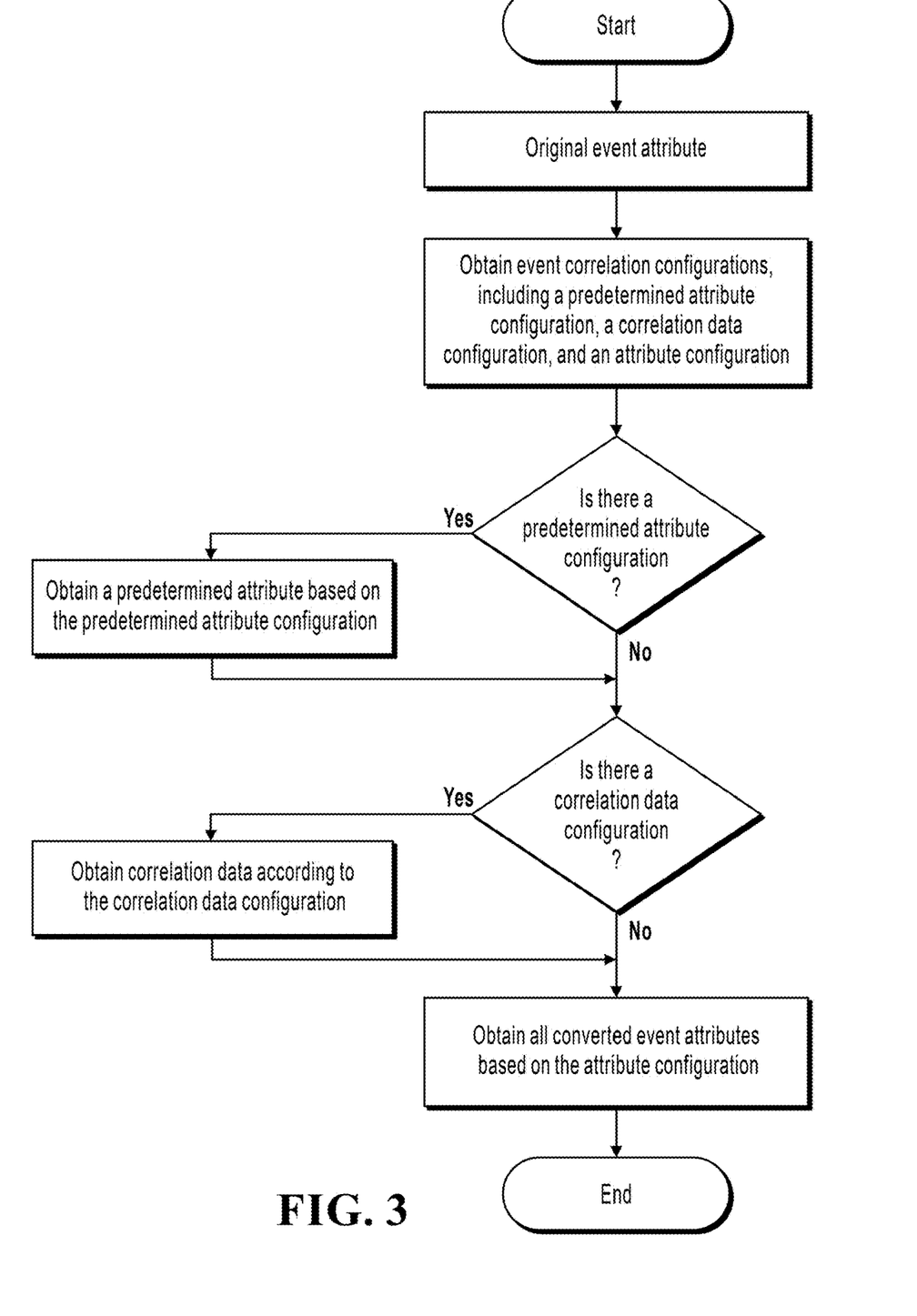
FIG. 3 is a flowchart illustrating a method for processing an original event attribute, according to the embodiments of the present application.

FIG. 3 is a flowchart illustrating a method for processing original event attribute, according to the embodiments of the present application. In practice, after the original attribute of the current event is obtained, it is determined whether the correlation configuration of the current event includes a predetermined attribute configuration, a correlation data configuration, and an attribute configuration.

In one or more embodiments of the present application, converting the to-be-converted data based on a specified conversion mode to obtain an event attribute can specifically include: obtaining a corresponding configuration script based on the predetermined attribute configuration; and converting the to-be-converted data by using the configuration script, so as to obtain an event attribute.

For example, when data conversion is performed based on the predetermined attribute configuration, each predetermined attribute is a configuration script, attribute data is used as an input, and the configuration script corresponding to the predetermined attribute configuration is executed to obtain a return value, that is, an event attribute.

Figure 4:
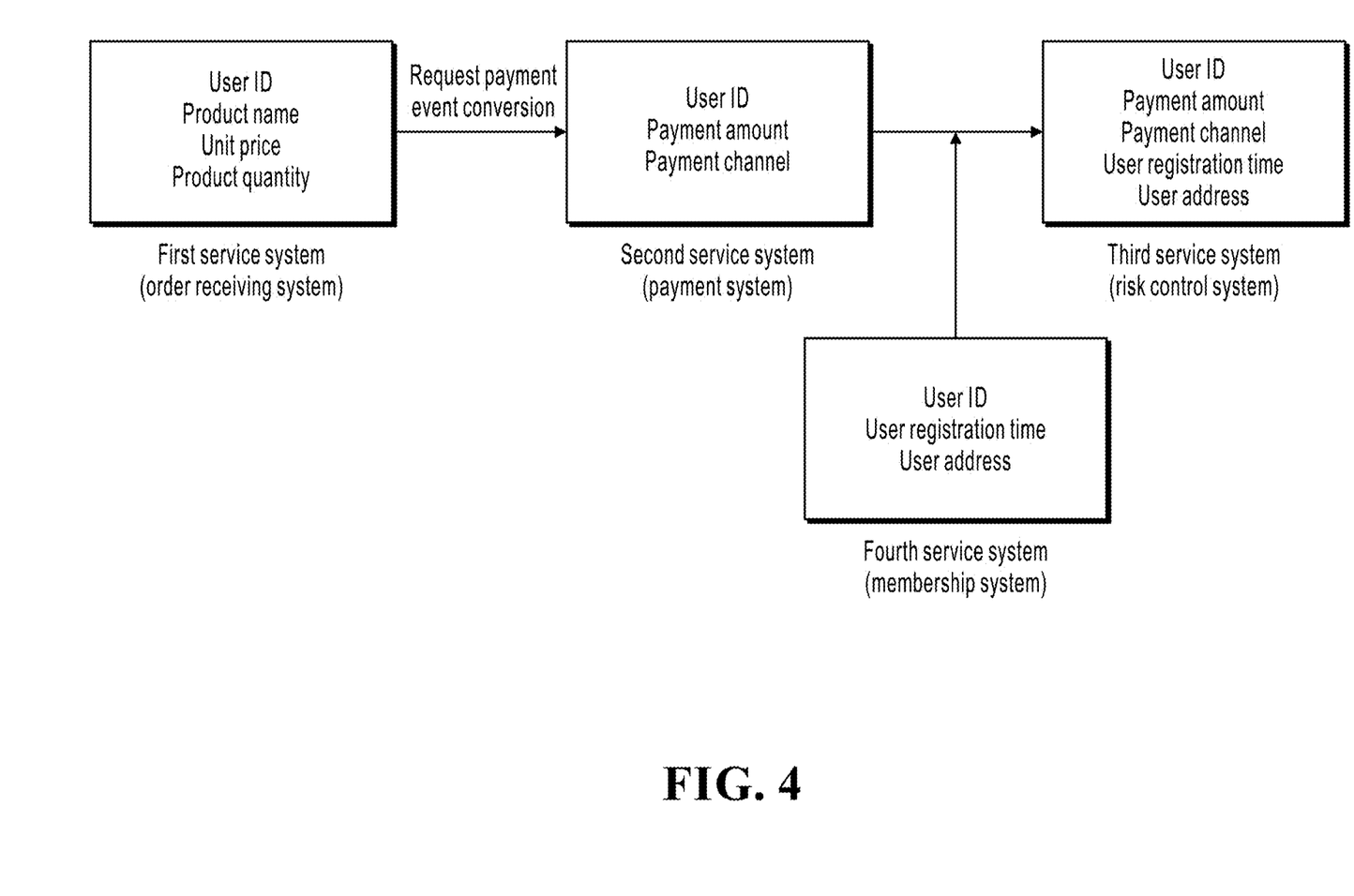
FIG. 4 is a schematic diagram illustrating an example data processing solution, according to the embodiments of the present application.

For ease of understanding, an example is described below. FIG. 4 illustrates an embodiment of a payment application scenario provided in the present application. Assume that there are four service systems in the current application scenario: a first service system (an order receiving system), a second service system (a payment system), a third service system (a risk control system), and a fourth service system (a membership system). In the payment process, first, the first service provides various original event attributes (such as user ID, product name, unit price, and product quantity) of the payment order event specified or established by the user. The second service system fills data based on the original event attribute provided by the first service system, for example, filling the original attributes such as the unit price and product quantity, so as to calculate the total price of the products. Further, the second service system extracts the required membership information from the fourth service system. If the data format of the membership information provided by the fourth service system needs to be adjusted, the data can be filled by using the configuration module disposed in the second service system, so as to output the data in the desired format. Further, data conversion is performed on the original event attribute and the attribute data that are output through the data filling, so as to output the event attribute, that is, the risk evaluation result for the event. For example, the third service system (the risk control system) outputs the risk evaluation result for the current payment service.

Figure 5:
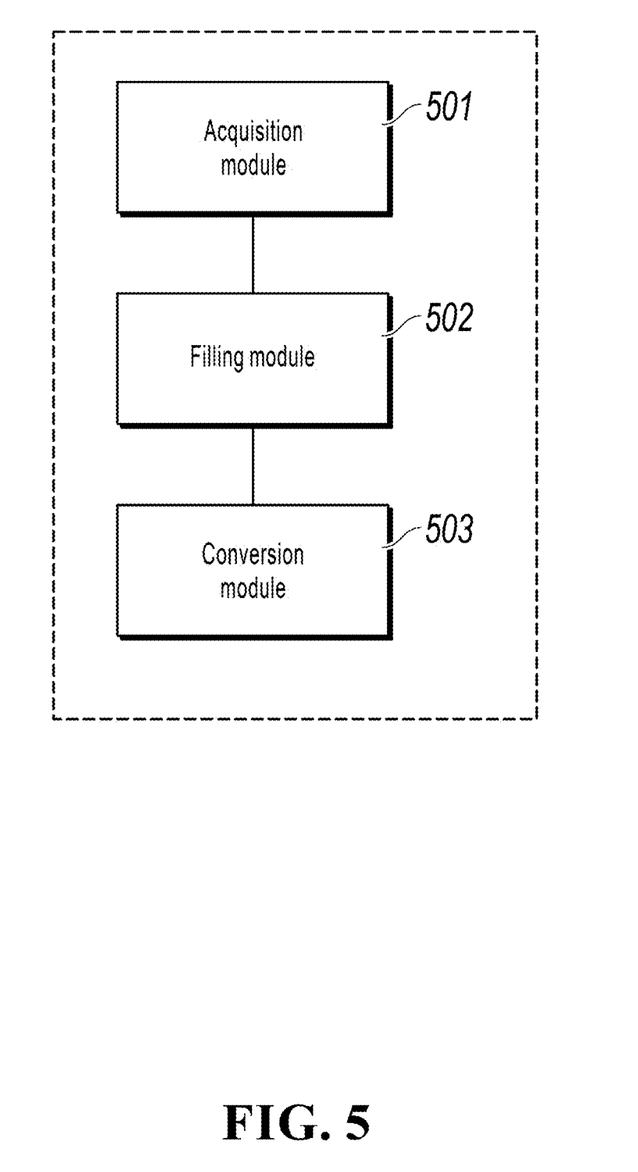
FIG. 5 is a schematic diagram illustrating a data processing apparatus, according to the embodiments of the present application.

Based on the same idea, FIG. 5 is a schematic diagram illustrating a data processing apparatus, according to the embodiments of the present application. The apparatus includes: an acquisition module 501, configured to obtain an original event attribute; a filling module 502, configured to fill data based on a predetermined event correlation configuration to obtain corresponding attribute data, where the predetermined event correlation configuration includes an attribute configuration; and a conversion module 503, configured to perform data conversion based on the original event attribute and the attribute data to obtain an event attribute.

Further, the acquisition module 501 is configured to: obtain, according to a predetermined attribute configuration mapping relationship, a configuration of at least one of the predetermined event correlations configuration mapped from the at least one attribute based on at least one of the original event attributes; or obtain, according to the configuration attribute mapping relationship, a specified the event correlation configuration based on the original event attribute.

Further, the event correlation configuration includes a predetermined attribute configuration; and the attribute data further includes a predetermined attribute; and the filling module 502 further includes a conversion unit, where the conversion unit is configured to fill data based on the predetermined attribute configuration and the original event attribute, and perform conversion to obtain a predetermined attribute.

Further, the event correlation configuration further includes a correlation data configuration; and the attribute data further includes correlation data; and the filling module further includes an acquisition unit, where the acquisition unit is configured to fill data based on a predetermined correlation data configuration, the original event attribute, and the predetermined attribute to obtain required correlation data, where the correlation data is obtained locally, from a storage system, or from a third party system.

Further, the conversion module 503 is configured to arrange the obtained original event attribute and the correlation data to obtain to-be-converted data; and convert the to-be-converted data based on a specified conversion mode to obtain an event attribute.

Further, the conversion module 503 is configured to: obtain a corresponding configuration script based on the predetermined attribute configuration; and convert the to-be-converted data by using the configuration script, so as to obtain an event attribute.

Based on the same idea, the embodiments of the present application further provide an electronic device, including: at least one processor, and a memory communicatively connected to the at least one processor, where the memory stores instructions that can be executed by the at least one processor, and the instructions are executed by the at least one processor to enable the at least one processor to: obtain an original event attribute; fill data based on a predetermined event correlation configuration to obtain corresponding attribute data, where the predetermined event correlation configuration includes an attribute configuration; and perform data conversion based on the original event attribute and the attribute data to obtain an event attribute.

Specific embodiments of the present application are described above. Other embodiments fall within the scope of the appended claims. In some situations, the actions or steps described in the claims can be performed in an order different from the order in some embodiments and the desired results can still be achieved. In addition, the process depicted in the accompanying drawings does not necessarily require a particular execution order to achieve the desired results. In some embodiments, multi-tasking and parallel processing can be advantageous.

The embodiments of the present application are described in a progressive method. For same or similar parts of the embodiments, mutual references can be made to the embodiments. Each embodiment focuses on a difference from the other embodiments. In particular, because the apparatus, the electronic device, and the non-volatile computer storage medium embodiment are basically similar to the method embodiment, the description is relatively simple. For the related parts, references can be made to the description of the method embodiment.

The apparatus, electronic device, and non-volatile computer storage medium provided in some embodiments of the present application correspond to the method. Therefore, the apparatus, device, and non-volatile computer storage medium also have beneficial technical effects that are similar to those of corresponding method. Because the beneficial technical effects of the method have been described in detail above, the beneficial technical effects of the corresponding apparatus, device, and non-volatile computer storage medium details are omitted here for simplicity.

In the 1990s, whether technology improvement is hardware improvement (for example, improvement of a circuit structure, such as a diode, a transistor, or a switch) or software improvement (improvement of a method procedure) can be clearly distinguished. However, as technologies develop, the current improvement for many method procedures can be considered as a direct improvement of a hardware circuit structure. A designer usually programs an improved method procedure to a hardware circuit, so as to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively, the device configured to implement various functions can even be considered as both a software module implementing the method and a structure in the hardware component.

The system, apparatus, module, or unit illustrated in the previous embodiments can be implemented by using a computer chip or an entity, or can be implemented by using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For convenience of description, the above devices are described separately in terms of their functions. Of course, during implementation of one or more embodiments of the present application, the functions of each module can be implemented in at least one of software or hardware.

A person skilled in the art should understand that the embodiments of the present application can be provided as methods, systems, or computer program products. Therefore, the embodiments of the present application can take a form of complete hardware embodiments, complete software embodiments, or embodiments combining software and hardware aspects. Further, the embodiments of the present application can take a form of a computer program product implemented on one or more computer-usable storage media (including but not limited to disk storage, CD-ROM, and optical storage.) containing computer-usable program code.

The present application is described with reference to at least one of a flowchart or block diagram of the method, device (system), and computer program product according to the embodiments of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present application, the computer readable medium does not include transitory media such as a modulated data signal and carrier.

It is also worthwhile to note that terms "include", "include" or any other variant is intended to cover non-exclusive inclusion, so that processes, methods, products or devices that include a series of elements include not only those elements but also other elements that are not explicitly listed, or elements inherent in such processes, methods, products or devices. An element described by "includes a . . . " further includes, without more constraints, another identical element in the process, method, product, or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The embodiments of the present application are described in a progressive method. For same or similar parts of the embodiments, mutual references can be made to the embodiments. Each embodiment focuses on a difference from the other embodiments. Particularly, a system embodiment is basically similar to a method embodiment, and therefore is described briefly. For related parts, references can be made to related descriptions in the method embodiment.

The above descriptions are merely examples of the present application and are not intended to limit the present application. For a person skilled in the art, the present application can be subject to various modifications and variations. Any modification, equivalent replacement or improvement made within spirit and principles of the present application shall be included in claims of the present application.

What is claimed is:

1. A computer-implemented method for data processing, comprising:
   obtaining, from a first service system and by a second service system, original event attributes of an event, wherein the first service system provides attribute data in a first format and wherein the second service system provides attribute data in a second format;

obtaining support data from a support service system that provides attribute data in a support data format;

performing, by the second service system, data filling to the original event attributes to obtain the attribute data in the second format based on the support data and a pre-configured event correlation configuration that comprises an attribute configuration; and providing, by the second service system, the attribute data in the second format to a third service system that provides attribute data in a third format for the third service system to perform data conversion based on the original event attributes and the attribute data in the second format to obtain updated event attributes, wherein the third format is different from the second format.

2. The computer-implemented method according to claim 1, comprising:

before performing data filling, obtaining the pre-configured event correlation configuration based on at least one of a pre-configured attribute configuration mapping relationship or at least one of the original event attributes.

3. The computer-implemented method according to claim 1, wherein the pre-configured event correlation configuration further comprises a predetermined attribute configuration and the attribute data further comprises a predetermined attribute.

4. The computer-implemented method according to claim 3, comprising:

performing the data filling based on the predetermined attribute configuration to obtain the predetermined attribute.

5. The computer-implemented method according to claim 3, wherein the attribute data further comprises correlation data obtained by performing the data filling based on the pre-configured event correlation configuration.

6. The computer-implemented method according to claim 5, wherein performing data conversion to obtain the updated event attributes comprises:

arranging the original event attributes and the correlation data to obtain arranged data; and converting the arranged data based on a conversion mode to obtain the updated event attributes.

7. The computer-implemented method according to claim 6, wherein converting the arranged data based on the conversion mode to obtain the updated event attributes comprises:

obtaining a configuration script based on the predetermined attribute configuration; and converting the arranged data based on the configuration script to obtain the updated event attributes.

8. A non-transitory, computer-readable medium storing one or more instructions executable by a computer system to perform operations comprising:

obtaining, from a first service system and by a second service system, original event attributes of an event, wherein the first service system provides attribute data in a first format and wherein the second service system provides attribute data in a second format;

obtaining support data from a support service system that provides attribute data in a support data format;

performing, by the second service system, data filling to the original event attributes to obtain the attribute data in the second format based on the support data and a pre-configured event correlation configuration that comprises an attribute configuration; and providing, by the second service system, the attribute data in the second format to a third service system that provides attribute data in a third format for the third service system to perform data conversion based on the original event attributes and the attribute data in the second format to obtain updated event attributes, wherein the third format is different from the second format.

9. The non-transitory, computer-readable medium according to claim 8, the operations comprising:

before performing data filling, obtaining the pre-configured event correlation configuration based on at least one of a pre-configured attribute configuration mapping relationship or at least one of the original event attributes.

10. The non-transitory, computer-readable medium according to claim 8, wherein the pre-configured event correlation configuration further comprises a predetermined attribute configuration and the attribute data further comprises a predetermined attribute.

11. The non-transitory, computer-readable medium according to claim 10, the operations comprising:

performing the data filling based on the predetermined attribute configuration to obtain the predetermined attribute.

12. The non-transitory, computer-readable medium according to claim 10, wherein the pre-configured event correlation configuration further comprises a correlation data configuration, and the attribute data further comprises correlation data obtained by performing the data filling based on the pre-configured event correlation configuration.

13. The non-transitory, computer-readable medium according to claim 12, wherein performing data conversion to obtain the updated event attributes comprises:

arranging the original event attributes and the correlation data to obtain arranged data; and converting the arranged data based on a conversion mode to obtain the updated event attributes.

14. The non-transitory, computer-readable medium according to claim 13, wherein converting the arranged data based on the conversion mode to obtain the updated event attributes comprises:

obtaining a configuration script based on the predetermined attribute configuration; and converting the arranged data based on the configuration script to obtain the updated event attributes.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, from a first service system and by a second service system, original event attributes of an event, wherein the first service system provides attribute data in a first format and wherein the second service system provides attribute data in a second format;

obtaining support data from a support service system that provides attribute data in a support data format;

performing, by the second service system, data filling to the original event attributes to obtain the attribute data in the second format based on the support data and a pre-configured event correlation configuration that comprises an attribute configuration; and providing, by the second service system, the attribute data in the second format to a third service system that provides attribute data in a third format for the third service system to perform data conversion based on the original event attributes and the attribute data in the second format to obtain updated event attributes, wherein the third format is different from the second format.

16. The computer-implemented system according to claim 15, the operations comprising:

before performing data filling, obtaining the pre-configured event correlation configuration based on at least one of a pre-configured attribute configuration mapping relationship or at least one of the original event attributes.

17. The computer-implemented system according to claim 15, wherein the pre-configured event correlation configuration further comprises a predetermined attribute configuration and the attribute data further comprises a predetermined attribute.

18. The computer-implemented system according to claim 17, the operations comprising:

performing the data filling based on the predetermined attribute configuration to obtain the predetermined attribute.

19. The computer-implemented system according to claim 17, wherein the pre-configured event correlation configuration further comprises a correlation data configuration, and the attribute data further comprises correlation data obtained by performing the data filling based on the pre-configured event correlation configuration.

20. The computer-implemented system according to claim 19, wherein performing data conversion to obtain the updated event attributes comprises:

arranging the original event attributes and the correlation data to obtain arranged data; and converting the arranged data based on a conversion mode to obtain the updated event attributes.

21. The computer-implemented system according to claim 20, wherein converting the arranged data based on the conversion mode to obtain updated event attributes comprises:

obtaining a configuration script based on the predetermined attribute configuration; and converting the arranged data based on the configuration script to obtain the updated event attributes.

* * * * *